United States Patent [19]

Duvalsaint et al.

[11] Patent Number: 5,684,975
[45] Date of Patent: Nov. 4, 1997

[54] METHOD FOR USE IN TRANSLATING VIRTUAL ADDRESSES INTO ABSOLUTE ADDRESSES

[75] Inventors: Karl Jean Duvalsaint, Hyde Park; Mark Steven Farrell, Pleasant Valley; Barry Watson Krumm, Poughkeepsie, all of N.Y.; Donald William McCauley, Austin, Tex.; Charles Franklin Webb, Poughkeepsie, N.Y.

[73] Assignee: International Business Machines Corporation, Armonk, N.Y.

[21] Appl. No.: 453,140

[22] Filed: May 30, 1995

Related U.S. Application Data

[62] Division of Ser. No. 414,671, Mar. 31, 1995.

[51] Int. Cl.[6] .................. G06F 12/00; G06F 2/02; G06F 9/26; G06F 9/34
[52] U.S. Cl. .................................................. 395/413
[58] Field of Search ........................ 395/412, 419, 395/421.1, 413, 416, 417; 364/200

[56] References Cited

U.S. PATENT DOCUMENTS

| | | | |
|---|---|---|---|
| 3,768,080 | 10/1973 | Boger et al. | 340/172.5 |
| 4,347,565 | 8/1982 | Kaneda et al. | 364/200 |
| 4,459,661 | 7/1984 | Kaneda et al. | 364/200 |
| 4,494,189 | 1/1985 | Bean et al. | 364/200 |
| 4,521,846 | 6/1985 | Scalzi et al. | 364/200 |
| 4,695,948 | 9/1987 | Blevins et al. | 364/200 |
| 4,695,950 | 9/1987 | Brandt et al. | 364/200 |
| 4,774,659 | 9/1988 | Smith et al. | 364/200 |
| 4,816,991 | 3/1989 | Watanabe et al. | 364/200 |
| 4,843,541 | 6/1989 | Bean et al. | 364/200 |
| 4,945,479 | 7/1990 | Rusterholz et al. | 364/200 |
| 4,965,720 | 10/1990 | Mitchell et al. | 364/200 |
| 5,023,773 | 6/1991 | Baum et al. | 364/200 |
| 5,210,840 | 5/1993 | Fukagawa et al. | 395/400 |
| 5,226,132 | 7/1993 | Yamamoto et al. | 395/400 |
| 5,230,045 | 7/1993 | Sindhu | 395/425 |
| 5,230,069 | 7/1993 | Brelsford et al. | 395/400 |
| 5,278,961 | 1/1994 | Mueller | 395/400 |
| 5,317,754 | 5/1994 | Blandy et al. | 395/800 |
| 5,335,333 | 8/1994 | Hinton et al. | 395/417 |
| 5,341,485 | 8/1994 | Hattersley et al. | 395/417 |
| 5,371,867 | 12/1994 | George et al. | 395/406 |

OTHER PUBLICATIONS

Hennessy, J.P. and Isisek, D.L., "Storage Reference by Absolute Address," IBM Technical Disclosure Bulletin, vol. 37, No. 01, pp. 273–275 (Jan. 1994).
ESA/390 Principles of Operation, 1990.

*Primary Examiner*—David K. Moore
*Assistant Examiner*—Than V. Nguyen
*Attorney, Agent, or Firm*—Lynn L. Augspurger; Blanche E. Schiller

[57] ABSTRACT

In a processing system, a translation is facilitated between a virtual address and an absolute address. The system includes multiple registers and a mechanism for loading them with a first set of address translation parameters. An adder sums a translation origin register with an offset register to produce a base-plus-offset value. A logic circuit selectively combines selected registers and the base-plus-offset value to produce an address of a translation table entry which facilitates a determination of the absolute address. This determination includes performing one or more of prefixing, windowing, zoning and memory begin. A latency of the system from a presentation of the translation origin register to the adder to the output of the translation table entry from the logic circuit is at most one clock cycle.

12 Claims, 5 Drawing Sheets

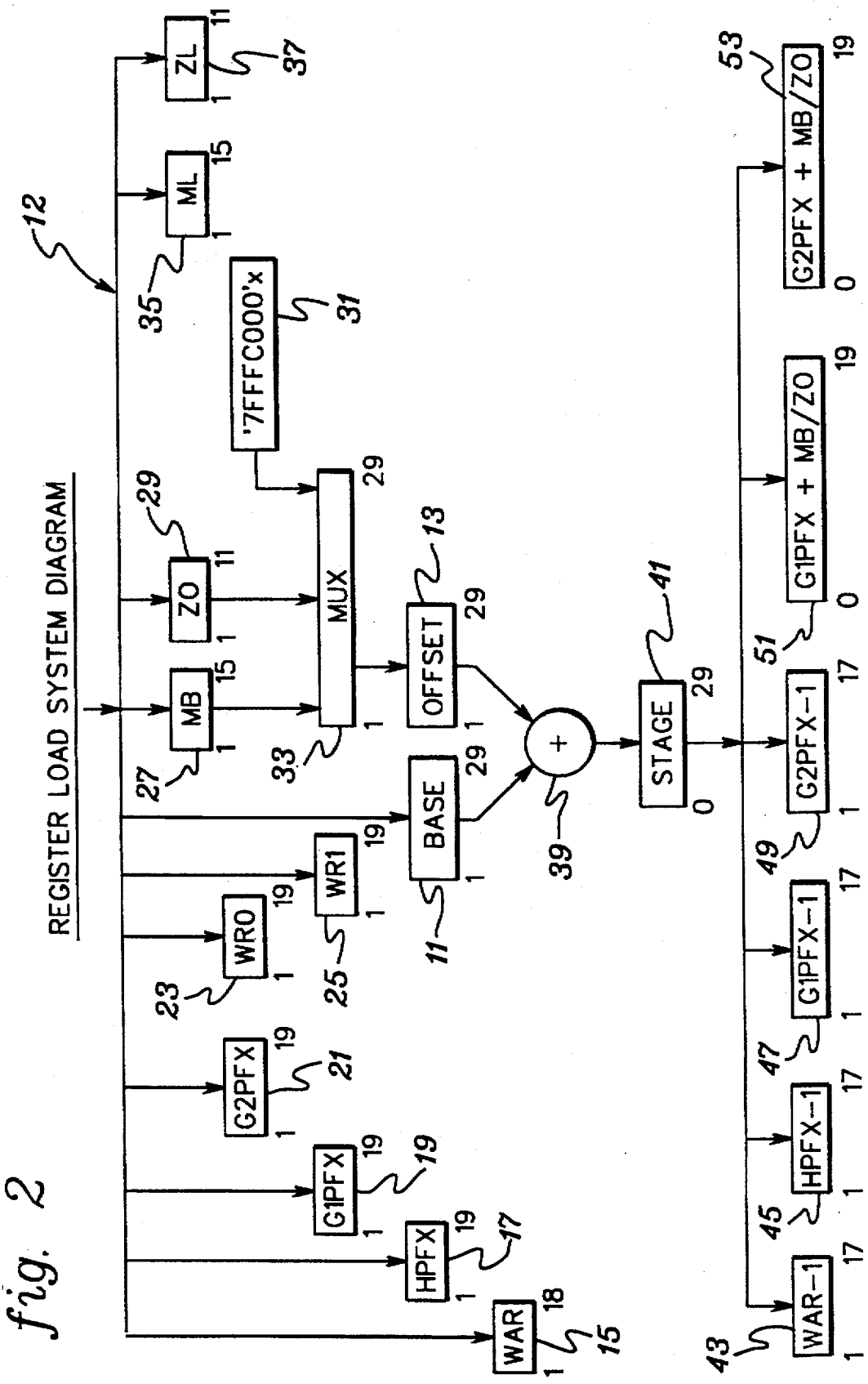

METHOD FOR USE IN TRANSLATING VIRTUAL ADDRESSES INTO ABSOLUTE ADDRESSES

This application is a division of application Ser. No. 08/414,671, filed Mar. 3, 1995.

TECHNICAL FIELD

The present invention relates to addressing memory in a data processing system. More particularly, the present invention relates to techniques for use in translating virtual addresses to absolute addresses.

BACKGROUND OF THE INVENTION

Powerful data processing systems contain vast hardware resources such as multiple processors and large amounts of storage. An IBM Enterprise Systems Architecture ("ESA") /390 mainframe computer is an example of one such processing system. In order to provide larger amounts of apparent main storage to a user than is available, the main storage of the system is often supplemented with auxiliary storage. As examples, the main system storage is typically semiconductor memory such as random access memory ("RAM"), while the auxiliary storage is often disk storage such as a direct access storage device ("DASD").

With appropriate support by an operating system, main storage and auxiliary storage may be used to provide to a user a system wherein storage appears to be larger than the actual main storage which is available in the configuration. This apparent main storage is referred to as virtual storage, and the addresses used to designate memory locations in the virtual storage are referred to as virtual addresses. The virtual storage of a user may advantageously exceed the size of the actual main storage which is available.

The virtual storage is considered to be composed of blocks of addresses, called pages. Only the most recently referred-to pages of the virtual storage are assigned to occupy blocks of actual main storage. As the user refers to pages of virtual storage that do not appear in main storage, they are brought in to replace pages in main storage that are less likely to be needed. The swapping of pages of storage may be performed by the operating system without the user's knowledge.

One aspect of management of virtual memory is translating virtual addresses to absolute addresses in actual main memory. The conventional technique for translating a virtual address to an absolute address includes a translation from the virtual address to a real address and then a translation from the real address to the absolute address. The following three separately and sequentially performed steps are conventionally required during multiple states of the translation of virtual addresses to absolute addresses:

(1) adding a translation table origin ("tto") value to a translation table index ("tti") value to produce a first adder result;

(2) prefixing and windowing the first adder result of step (1) (this involves multiple comparisons and substitutions of values based upon the comparisons); and (3) adding an offset to the prefixed and windowed first adder result of step (2) to determine an address of a translation table entry ("atte") that is used in subsequent address translation steps.

As explained above, one part of the conventional address translation process comprises virtual address to real address translation. This may be conventionally performed by, for example, Dynamic Address Translation ("DAT") and/or Access Register Translation ("ART"), as will be apparent to one of ordinary skill in the art. Specifically, DAT and ART are explained in the IBM ESA/390 Principles of Operation, IBM publication number SA22-7201-02, December 1994, which is hereby incorporated herein by reference in its entirety.

The IBM ESA/390 Principles of Operation document also defines several emulation modes which are relevant to address translation and are set by mode latches. Specifically, separate registers are used in association with different emulation modes. The Start Interpretive Execution ("SIE") instruction initiates an emulation mode. In that regard, the architecture defines a prefix register and a prefixing function which vary based upon the emulation mode. In particular, the host prefix register ("HPFX") applies when no emulation is active, the Guest-1 prefix register ("G1PFX") applies to a first-level SIE guest, and the Guest-2 prefix register ("G2PFX") applies to a second-level SIE guest.

The IBM 370/XA Interpretive Execution Architecture document, IBM publication number SA22-7095-0, January 1984, further defines the Start Interpretive Execution ("SIE") instruction and the operation of a guest program, and is hereby incorporated herein by reference in its entirety. This includes definition of a main storage origin memory begin ("MB") register and main storage limit for the guest. Specifically, the main storage limit is the sum of MB and the extent of the main storage, the sum being contained in a main storage limit ("ML") register for the guest. This architecture also defines the guest versions of the ESA/390 prefix registers discussed hereinabove.

The extension of the ESA/390 Interpretive Execution Architecture to a second level guest is disclosed in U.S. Pat. No. 4,843,541 entitled "Logical Resource Partitioning of a Data Processing System," issued Jun. 27, 1989, and filed Jul. 29, 1987, and hereby incorporated herein by reference in its entirety. Described therein are the zone origin ("ZO") and zone limit ("ZL") registers which operate similarly to the above-discussed MB and ML registers, respectively. Specifically, in an environment using two levels of emulation, the first-level guest uses G1PFX as the prefix register, and operates in the zone of main storage defined by ZO and ZL, while the second-level guest uses G2PFX as the prefix register, and operates in the portion of the first-level guest's zone defined by MB and ML.

By way of further explanation, conventional prefixing is used during the translation of a real address to an absolute address and comprises modifying the first adder result (i.e., the real address produced by step one of the conventional translation routine described above) based upon the results of multiple comparisons. Specifically, if bits 1:19 of the first adder result are zeros, then bits 1:19 are replaced with a selected prefix register (selected from one of HPFX, G1PFX or G2PFX based upon the mode latches). Alternatively, if bits 1:19 of the first adder result are equal to the selected prefix register, then bits 1:19 of the first adder result are replaced by zeroes. Lastly, if bits 1:19 of the first adder result are equal to neither zeroes nor the prefix register, then bits 1:19 remain unchanged. Thus, conventional prefixing is performed.

A Window Address Facility is disclosed in U.S. Pat. No. 5,371,867, entitled "METHOD OF USING SMALL ADDRESSES TO ACCESS AND GUEST ZONE IN A LARGE MEMORY," issued Dec. 6, 1994 and incorporated herein by reference in its entirety. Described therein are the Window Address Register ("WAR") and the Window Registers WR0 and WR1. The windowing techniques function in conjunction with prefixing such that the absolute address is confined to a width of one memory page.

Conventional windowing comprises modifying the first adder result (step one) based upon the results of multiple comparisons. First, bits 1:18 of the first adder result are compared to the window address register (WAR). If the comparison is negative (unequal), then the first adder result remains unchanged. However, if the comparison is positive (equal), then bits 1:19 of the first adder result are modified. Specifically, if bit 19 of the first adder result is zero (0), then bits 1:19 of the first adder result are replaced by the contents of window register 0 ("WR0"). If bit 19 of the first adder result is one (1), then bits 1:19 of the first adder result are replaced by the window register 1 ("WR1"). Thus, conventional windowing is thereby performed.

The conventional third step completes the determination of the atte. Specifically, an offset value is added to the prefixed and windowed adder result such that the atte is determined.

The above described steps performed within the conventional virtual address to absolute address translation technique has several disadvantages associated with it. First, the adding/prefixing-windowing/offsetting steps within the conventional technique require three complete clock cycles to execute, one for each step. Second, two separate adders are necessary, thus requiring more silicon real estate. Third, three separate control states are present in the conventional design, one state corresponding to each of the three required clock cycles per conversion. This slows the address translation process and makes debugging difficult. Lastly, the multiple stages and adders result in relatively complex circuitry.

The present invention is directed towards solving the above noted problems.

DISCLOSURE OF THE INVENTION

Briefly described, in a first aspect, the present invention includes a system for use in translating a virtual address to an absolute address. The system is within a processor which operates according to a clock. Specifically, the system comprises multiple registers and means for loading them with a first set of address translation parameters. Further included is an adder for adding a tto an offset. An output of the adder comprises a base-plus-offset value.

The system also includes a logic circuit which is coupled to and operative with the adder. The logic circuit determines an atte and performs at least one of windowing, prefixing, zoning and memory begin, using the base-plus-offset value and one or more of the multiple registers. The system latency from a presentation of the tto to the adder, to an output of the atte from the logic circuit, is at most one clock cycle of the clock of the processor.

As an enhancement, the registers may include first registers and corresponding minus one registers. In particular, each minus one register has a value of one less than its corresponding first register. The system may also include a means for comparing at least some of the first registers and at least some of the minus one registers to the tto. This means for comparison has multiple outputs which determine a portion of the atte. Further, the adder may be the one and only adder in the system. Additional system characteristics and a corresponding method are disclosed herein.

In summary, the techniques of the present invention facilitate the conversion of virtual addresses to absolute addresses using parallel techniques. This enables aspects of the address translation to be performed within a single processor clock cycle using only a single adder. This simplifies the required circuitry and also facilitates simpler debugging. Thus, the present invention provides an improvement to address translation in data processing systems.

BRIEF DESCRIPTION OF THE DRAWINGS

The subject matter which is regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

FIG. 2 is a system diagram of the components and data paths used for loading a plurality of registers according to one embodiment of the present invention.

BEST MODE FOR CARRYING OUT THE INVENTION

The techniques of the present invention facilitate the adding/prefixing-windowing/offsetting steps within the translation of virtual addresses to absolute addresses. This is performed in a highly efficient manner such that the steps are achieved within one clock cycle of the system clock. Further, only one adder, and a corresponding single add operation are necessary. Thus, the translation techniques disclosed herein represent a marked improvement over conventional multiple clock cycle, multiple control state and multiple adder techniques.

Figure 1:
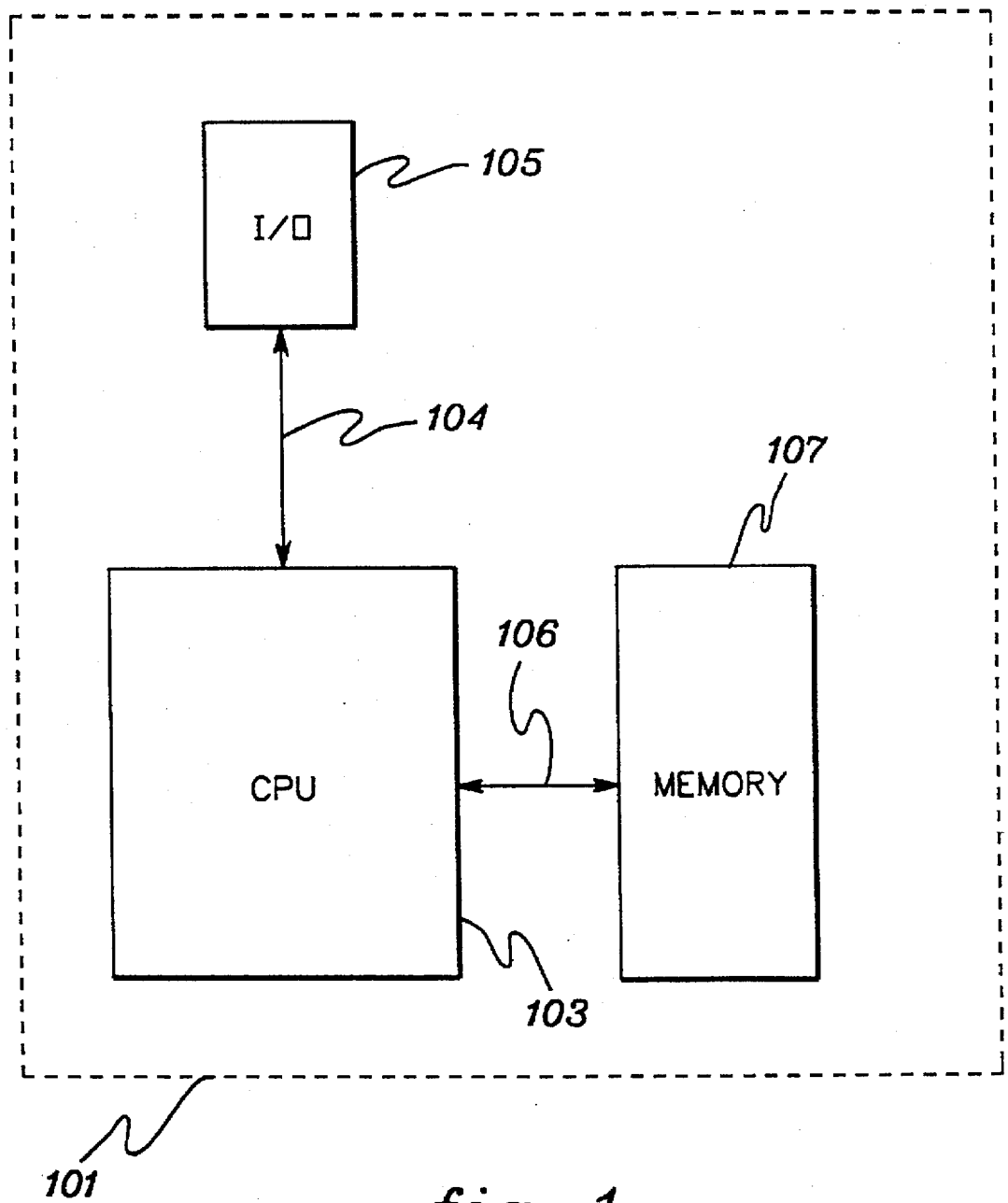
FIG. 1 is a block diagram of a computer system within which the address translation techniques of the present invention are implemented in conformance with an embodiment of the present invention.

Specifically, the techniques of the present invention are applicable to computer systems which employ virtual memory such as, for example, an International Business Machines Enterprise System Architecture/390 mainframe computing system. As an example, a typical computer system 101 is shown in FIG. 1. Computer system 101 includes a central processing unit ("CPU") 103, an input/output ("I/O") unit 105 and a memory 107 (e.g., random access memory). The CPU 103 is coupled to I/O unit 105 via, for example, a bi-directional bus 104, and is coupled to memory 107 via, for example, a hi-directional bus 106. Processing systems with the features described hereinabove or equivalent may be subject to the techniques of the present invention.

The translation of a virtual address to an absolute address includes a repetitive use of the system of the present invention. One particular example is described herein. As one Dynamic Address Translation ("DAT") example, an input to the system of the present invention may comprise a Segment Table Origin ("STO") and a Segment Index ("SX") of a virtual address. These inputs are designated as a translation table origin ("tto") and a translation table index ("tti"), respectively. The output of the system of the present invention given these inputs will comprise an atte that is used as a look up in a segment table to produce a Page Table Origin ("PTO"). The individual steps of such a look-up will be apparent to one of ordinary skill in the art.

To continue with the particular example, the PTO is then used as the tto input of the system of the present invention and a Page Index ("PX") of the virtual address is used as the tti input. The output of the system given these inputs will comprise an atte that is used to look up a Page Frame Real Address ("PFRA") in a page table. Again, the individual steps of such a look-up will be apparent to one of ordinary skill in the art. The PFRA is then combined with a Byte Index ("BX") of the virtual address and this combined result is prefixed and windowed to produce the absolute address. Specifically, the PFRA is used as the left-hand side, and the BX is used as the right-hand side of a register to which the prefixing and windowing is performed to produce the absolute address. To note, in the above described steps that determined the PTO and the PFRA, prefixing and windowing were performed therein. The present invention concerns a method and system for producing the atte from the tti and tto.

The techniques of the present invention facilitate faster virtual address to absolute address translation than is conventionally known. However, many of the registers used during conventional address translation are also used by the techniques of the present invention. These registers will be apparent to one of ordinary skill in the art and include, for example, the WAR, HPFX, G1PFX, G2PFX, WR0, WR1, MB, ZO, ML and ZL registers discussed in the Background section hereinabove.

It has been observed that the values of many of the conventional registers do not change often in relation to occurrences of address translation. The present techniques take advantage of this characteristic to predetermine multiple intermediate values based upon the conventional registers. These predetermined values are stored in several new registers which are added to the conventional processing system and facilitate the faster, single cycle address translation techniques of the present invention. Loading these new registers, and the conventional registers, is described in detail below with respect to the register load system diagram of FIG. 2.

The register load system diagram of FIG. 2 shows one embodiment of the data paths, registers and system components used during the register preloading thereof. As discussed previously, this loading is performed in anticipation of actual virtual to absolute address translation. Specifically, the register load bus 12 is connected to each of the above-discussed conventional registers. In particular, each of a WAR register 15, an HPFX register 17, a G1PFX register 19, a G2PFX register 21, a WR0 register 23, a WR1 register 25, an MB register 27, a ZO register 29, an ML register 35 and a ZL register 37 is loaded. As will be apparent to one of ordinary skill in the art, these registers are loaded by presenting a value to be written to a selected register on the register load bus 12 and enabling a write-in latch on the selected register. The selected register is accordingly loaded with the value presented. This is performed for each conventional register such that they are all loaded.

Once a conventional register is loaded, any new registers dependent therefrom may be loaded. These new registers may include, for example, "–1" (i.e., minus one) registers such as an HPFX-1 register 45, a G1PFX-1 register 47, a G2PFX-1 register 49 and a WAR1 register 43. In addition to the minus one registers are prefix plus offset registers including, for instance, a G1PFX+MB/ZO register 51 and a G2PFX+MB/ZO register 53.

The loading of the new registers is facilitated by the system elements and data paths shown in FIG. 2. As an example, each of the minus one registers is loaded with the value of its corresponding conventional register minus one. This subtraction is performed by a two's complement addition of the hexadecimal value 7FFFC000 to the respective conventional register. Specifically, a mux 33 is selectively engaged to route the value 7FFFC000 hexadecimal of a register 31 to an offset register 13. To note, register 31 could be replaced by hardwiring the hexadecimal value of 7FFFC000 to the corresponding input of mux 33. Simultaneously, the output of one of the conventional registers for which a minus one is to be calculated is engaged on the register load bus, and the value is latched into a base register 11. The values contained in base register 11 and offset register 13 are added using an adder 39, and the result is latched into a stage register 41. Again, because of the two's complement addition of 7FFFC000 hexadecimal (bits 1:17=1's, while the other bits are 0's), a value of the conventional register minus one is produced by the addition. The resulting value of the addition may then be latched into a selected one of the new registers discussed hereinabove. This same adder 39 is subsequently used during address translation, thus making efficient use of system resources.

As an example of a minus one register load using the above-described techniques, the contents of HPFX register 17 minus one is stored in HPFX-1 register 45. Specifically: the value of HPFX register 17 is latched into base register 11; the value of 7FFFC000 in register 31 is latched through mux 33 into offset register 13; the values are added and the result is placed in stage register 41; and the value of stage register 41 is latched into HPFX-1 register 45. Similarly, minus one register loads are performed in conjunction with register pairs comprising G1PFX register 19/G1P/FX-1 register 47, G2PFX register 21/G2PFX-1 register 49, and WAR register 15/WAR-1 register 43. Each of these respective loads are performed during system initialization, and are individually repeated when one of the conventional registers changes such that a new register dependent therefrom is accordingly updated.

Several multiplexers within the present invention have their selection inputs controlled by the system mode latches. The mode latches and their relationship to emulation modes is summarized, for example, in the table set forth below:

| | Emulation Modes | | | | | | |
|---|---|---|---|---|---|---|---|
| mode | emulation | nrf | g1 | g2 | pre-ferred | pageable | mcds | sub-set |
| host | 0 | 0 | 0 | 0 | 0 | 0 | 0 | 0 |
| g1 nrf | 1 | 1 | 1 | 0 | 0 | 0 | 0 | 0 |
| g1 preferred | 1 | 0 | 1 | 0 | 1 | 0 | 0 | 0 |
| g1 pageable | 1 | 0 | 1 | 0 | 0 | 1 | 0 | 0 |
| g1 subset | 1 | 0 | 1 | 0 | 0 | 1 | 0 | 1 |
| g1 mcds | 1 | 0 | 1 | 0 | 0 | 1 | 1 | 0 |
| g1 subset & mcds | 1 | 0 | 1 | 0 | 0 | 1 | 1 | 1 |
| g2 preferred | 1 | 1 | 0 | 1 | 1 | 0 | 0 | 0 |
| g2 pageable | 1 | 1 | 0 | 1 | 0 | 1 | 0 | 0 |
| g2 subset | 1 | 1 | 0 | 1 | 0 | 1 | 0 | 1 |
| g2 mcds | 1 | 1 | 0 | 1 | 0 | 1 | 1 | 0 |
| g2 subset & mcds | 1 | 1 | 0 | 1 | 0 | 1 | 1 | 1 |

The system modes include, for example, a host mode, guest 1 ("g1") modes and guest 2 ("g2") modes. The various modes and associated mode latches will be apparent to one of ordinary skill in the art. As examples, the mode latches are defined as follows:

Emulation—The processor is executing instructions for an SIE guest (any variety of guest).

RRF—The processor is executing instructions for an SIE guest which uses the Region Relocation Facility ("RRF"). An RRF guest may itself execute an SIE instruction and thus act as the host to a second-level guest.

G1—The processor is executing instructions for a first level SIE guest.

G2—The processor is executing instructions for a second-level SIE guest; in this case, the first level guest is an RRF guest.

Preferred—The processor is executing instructions for an SIE guest using the preferred storage mode. This is defined in the base SIE architecture.

Pagable—The processor is executing instructions for an SIE guest using the pagable storage mode. This is defined in the base SIE architecture.

MCDS—The processor is executing instructions for an SIE guest which uses the Multiple-Controlled Data Spaces ("MCDS") facility. This facility allows the SIE host to provide guest access to multiple address spaces which are controlled by the host.

Subset—The processor is executing instructions for an SIE guest which uses the Expedited SIE Subset facility. This facility provides a subset of full SIE function so as to enable improved SIE performance.

The registers and data paths of the system of FIG. 2 also facilitate the loading of the prefix plus offset registers G1PFX+MB/ZO 51 and G2PFX+MB/ZO 53. Specifically, either MB register 27, ZO register 29 or neither is selectively routed through mux 33 based upon the status of the mode latches (representative of the emulation modes discussed hereinabove), and latched into offset register 13. For example, for G1PFX, MB is selected when rrf=0 and ZO is selected when rrf=1. For G2PFX, for example, MB is selected when preferred=0, while ZO is selected when preferred=1. Such selection will be apparent to one of ordinary skill in the art. The value of, for example, G1PFX register 19 is engaged on register load bus 12 and latched into base register 11. This base value may then be added using adder 39 to the offset value stored in offset register 13, and the result stored in stage register 41. The value of stage register 41 is then latched into G1PFX+MB/ZO register 51. Register G2PFX+MB/ZO is similarly loaded by adding the value of G2PFX register 21 to the MB/ZO value in offset register 13. Note that G1PFX+MB/Z0 and G2PFX+MB/Z0 start at bit 0, where bit 0 is the carry out of bit 1.

Thus, each of the new registers is loaded with its appropriate value pursuant to the techniques of the present invention. These values are subsequently used in the translation of virtual addresses to absolute addresses discussed below. In the event that the value of one of the conventional registers changes, the value of any corresponding new register is also updated per the techniques discussed hereinabove. However, these changes are infrequent in relation to the frequency of address translation, thus the time associated with such updating is minimal with respect to overall processing.

Figure 3A:
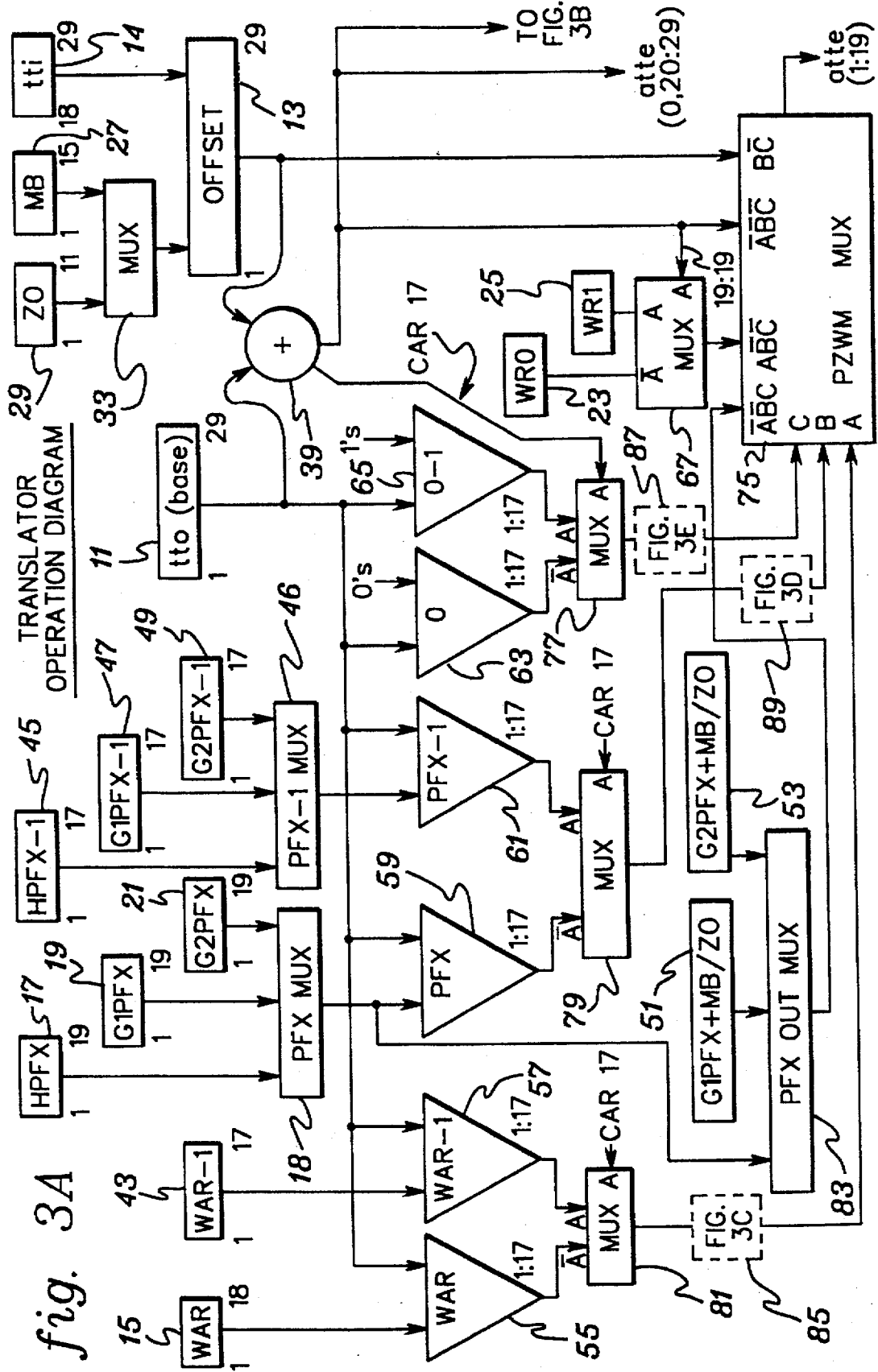
FIGS. 3A–3E depict a system diagram of the components and data paths used for address translation pursuant to an embodiment of the present invention.

Shown in FIGS. 3A–3E is one example of a system diagram of the register and data flow configuration used during the address translation techniques of the present invention. The system provides for adding a translation table origin ("tto") to a translation table index ("tti") to produce a first adder result. As one example, base register 11 includes the tto and a register 14 includes the tti (FIG. 3A). Specifically, the adding is performed by adding the tto in base register 11 and the tti in register 14 (which has been loaded into offset register 13) in adder 39 to produce a base-plus-offset value. The tto occupies bits 1:29 (bit 1 to bit 29) and the tti occupies register bits 18:29 (bit 18 to bit 29) of their respective registers. It should be noted that adder 39 is the same adder used in the loading stage shown in FIG. 2, thus illustrating one example of making efficient use of system resources.

Part of the adding discussed above comprises including an offset value of the ZO register, MB register or neither in offset register 13 as determined by the mode latches. Specifically, ZO register 29, MB register 27, or neither in the left-hand side of offset register 13 concurrent with the right-hand side tti register 14 value. Again, the pre-loaded ZO register 29, MB register 27 or neither is selected using mux 33 as controlled by the mode latches (the same mux as in the pre-load shown in FIG. 2) For example, for the first state of DAT translation where pagable=1, subset=0 and mcds=0, mux 33 is fed from MB. For translation where g1=1 and rrf=1, mux 33 is fed from ZO, while for translation where g1=0 and g2=0, neither ZO nor MB is selected.

It is important to note that the above described adding of the MB/ZO to the offset register may be performed initially in the present invention due to the special prefixing/windowing techniques described below. In previous techniques, the offset step is not performed until a third stage which occurs during a third processor clock cycle. In contrast, the techniques of the present invention facilitate the atte determination to be performed within a single clock cycle. Specifically, according to the techniques of the present invention, prefixing and windowing are performed substantially in parallel with the adding step of FIG. 3A described hereinabove rather than sequentially.

Accordingly, the new pre-loaded registers (e.g., the minus one registers) are used to achieve single stage performance. Specifically, various pre-loaded registers, as well as the results of adder 39 are made available for selection as part of the resultant address of a translation table entry ("atte"). These values are input to an output multiplexer comprising a prefixing-zoning-windowing-memory begin multiplexer ("PZWM MUX") 75 which produces bits 1:19 of the atte output (the remainder of the output, namely bits 0 and 20:29 are obtained directly from the output of adder 39). This facilitates the single stage performance described herein.

Selection of the output of the PZWM MUX 75 is based upon comparisons performed in the comparators 55, 57, 59, 61, 63 and 65 (as well as comparators 90, 92 and 94 discussed hereinbelow). These comparators detect various prefixing/windowing conditions which facilitate the selection of the proper atte bits 1:19 output by PZWM MUX 75. To summarize, these comparators include the WAR comparator 55, WAR-1 comparator 57, PFX comparator 59, PFX-1 comparator 61, O's (zero's) comparator 63 and 0−1 (zero's minus one) comparator 65. Prior to undertaking a detailed discussion of the operation of the comparators, the functionality of the minus one registers with respect to the comparisons performed are discussed hereinbelow.

Two general scenarios regarding the windowing and prefixing comparisons exist within the present invention. First, the addition of tto (1:29) with tti (18:29) could result in no carry into bit 17 (i.e., signal CAR 17 is off). In this case, prefixing/windowing comparisons are performed between the conventional registers and the left-side of the tto. However, if a carry into bit 17 resulted from the add in adder 39 (i.e., signal CAR 17 is on), then prefixing/windowing comparisons are performed between the minus one registers and the left side of the tto.

The various comparators and their respective functionality and association with PZWM MUX 75 are detailed below.

The windowing comparisons between tto register 11 and the WAR registers is provided by WAR comparator 55 and WAR-1 comparator 57. The MUX 81 selects which of the WAR compares is to be potentially used as the 'A' selector input of PZWM MUX 75. Specifically, if no carry is detected into bit 17 of the adder, then the output of WAR comparator 55 is routed through an element 85 (described below) to the PZWM MUX 75 as selector input 'A'. Alternatively, if a carry is detected into bit 17 of the adder, then the output of WAR-1 comparator 57 is routed through element 85 to the 'A' selector input of PZWM MUX 75.

Similarly, the prefixing comparisons between tto register 11 and the selected prefix registers are provided by PFX comparator 59 and PFX-1 comparator 61. The MUX 79 selects which of the prefix compares is to be potentially used as the 'B' selector input of PZWM MUX 75. In particular, if no carry is detected into bit 17 of the adder, then the output of PFX comparator 59 is routed through an element 89 (described below) to the 'B' selector input of PZWM MUX 75. Alternatively, if a carry is detected into bit 17 of the adder, then the output of PFX-1 comparator 61 is routed through element 89 to the 'B' selector input of PZWM MUX 75.

The actual prefix register used for comparison in comparator 59 is selected based upon the mode latches using prefix ("PFX") multiplexer 18. The choice of the PFX register for comparison is selected from one of the following registers: HPFX register 17, G1PFX register 19 and G2PFX register 21. Concurrently, a selection of a minus one prefix register for comparison in comparator 61 is performed by a prefix minus one (PFX–1) multiplexer 46 from one of the pre-loaded registers comprising HPFX-1 45, G1PFX-1 47 or G2PFX-1 49. This selection is also based upon the mode latches as will be apparent to one of ordinary skill in the art. For example, if g1=0 and g2=0 then hpfx/hpfx-1 is selected, if g1=1 and rrf=1 then g1pfx/g1pfx-1 are selected, while if g2=1 and preferred=1 then g2pfx/g2pfx-1 are selected.

Further, the prefixing comparisons between tto register 11 and the zeroes registers (or hardwired values) are provided by "0" comparator 63 and "0-1"comparator 65. A MUX 77 selects which of the prefix compares is to be potentially used as the 'C' selector input of PZWM MUX 75. In particular, if no carry is detected into bit 17 of the adder, then the output of "0" comparator 63 is routed through an element 87 (described below) to the 'C' selector input of PZWM MUX 75. Alternatively, if a carry is detected into bit 17 of the adder, then the output of "0-1" comparator 65 is routed through element 87 to the 'C' selector input of PZWM MUX 75.

As discussed above, comparator elements 85, 87 and 89 (FIGs. 3C-3E) are included in the present invention between the comparator muxes 77, 79 and 81 and the corresponding selector inputs of PZWM MUX 75 of FIG. 3A. Element 85 is shown in FIG. 3C, and couples an output of mux 81 to the 'A' selector input of PZWM MUX 75 (FIG. 3A). The output of mux 81, is coupled to one input of an AND gate 91. An output of AND gate 91 is coupled to the selector 'A' input of PZWM MUX 75, while another input of AND gate 91 is coupled to an output of a comparator 90. The inputs of comparator 90 comprise WAR register 15 bit 18 and the output of adder 39 bit 18.

Regarding element 89, the output of MUX 79 (FIG. 3A) is coupled to one input of an AND gate 93 (FIG. 3D), while the output of the AND gate 93 is coupled to the selector 'B' input of PZWM MUX 75 (FIG. 3A). Another input of AND gate 93 is coupled to an output of a comparator 92. The inputs of comparator 92 comprise bits 18:19 of the output of PFX MUX 18 and bits 18:19 of the output of adder 39.

In regard to element 87, the output of MUX 77 (FIG. 3A) is coupled to one input of an AND gate 95 (FIG. 3E), while the output of the AND gate 95 is coupled to the selector 'C' input of PZWM MUX 75 (FIG. 3A). A second input of AND gate 95 is coupled to an output of a comparator 94. The inputs of comparator 94 comprise zeroes and bits 18:19 of the output of adder 39.

The 'A', 'B' and 'C' selector inputs of PZWM MUX 75 (FIG. 3A) are used to select which of the data inputs of PZWM MUX 75 is routed to its output. One data input to PZWM MUX 75 is provided by a prefix output multiplexer ("PFX OUT MUX") 83. Specifically, the output of PFX OUT MUX 83 may comprise either the prefix register from PFX MUX 18, the pre-loaded G1PFX+MB/ZO register 51 or the pre-loaded G2PFX+ZO/MB register 53. This selection of which input of the PFX OUT MUX 83 is presented to the data input of PZWM MUX 75 is based upon the mode latches and will be apparent to one of ordinary skill in the art. For example, if g1=0 and g2=0 then PFX MUX 18 is selected. If g1=1 and rrf=1 then G1PFX+MB/ZO register 51 is selected, while if g2=1 and preferred=1 then G2PFX+MB/ZO register 53 is selected. For these examples ZO would be added to G1PFX and G2PFX at register load time.

The PFX OUT MUX 83 output is selected as the data input of PZWM MUX 75 if the selector inputs comprise ¯A¯BC (meaning NOT A and NOT B and C). This selector input combination is presented if the zeros prefixing test was positive (comparators 63/65) and all other comparisons were negative. Specifically, if the zeroes prefixing test is positive then the value of the selected prefix register is used as atte bits 1:19 via PZWM MUX 75. The offset addition of ZO/MB has already been accounted for in the present techniques by the pre-load of G1PFX+ZO/MB register 51 and G2PFX+ZO/MB register 53. Thus, an atte for the above conditions has been determined.

In accordance with the present invention, a positive prefixing comparison results in the engagement of the B¯C data input of the PZWM MUX 75. To further explain, if the compare of the prefix register against the tto is positive (e.g., comparators 59, 61) and the zeroes comparison is negative, then the selector input to PZWM MUX 75 comprises B¯C. In such a case, the selected data input is taken directly from the offset register 13, before adder 39 adds the value of tto. Also recall that the ZO/MB offset value is already present in the left-half of offset register 13. Thus, these techniques facilitate the substitution of zeros into the left-half of the first adder result and subsequent adding of ZO/MB.

In regard to windowing, to facilitate this functionality in the present invention, PZWM MUX 75 has an 'A' selector input from the windowing comparators (e.g., 55 and 57). Accordingly, if the state of the selector inputs of PZWM MUX 75 is $A^{18}$ B¯C and all other compares are negative, then the output of the windowing MUX 67 is engaged as the output of PZWM MUX 75. Specifically, windowing MUX 67 selects from either the WR0 register 23 or the WR1 register 25 depending on the value of the adder's (39) bit 19 as discussed hereinabove. Thus, the substitution of the window registers within the atte output is facilitated. To note, windowing and ZO/MB are mutually exclusive.

Lastly, if none of the windowing or prefixing compares are positive, then the ¯A¯B¯C data input of PZWM MUX 75 is selected. This input comprises the adder result of the tti, tto and ZO/MB values. Thus, an atte output unsubjected to any of the windowing or prefixing adjustments is provided.

A further aspect of the translation of virtual addresses to absolute addresses is the detection of addressing errors. These may include, for example, the exceeding of actual memory boundaries. When this type of type of condition is detected, an exception signal is generated such that a program interrupt occurs.

Figure 3B:
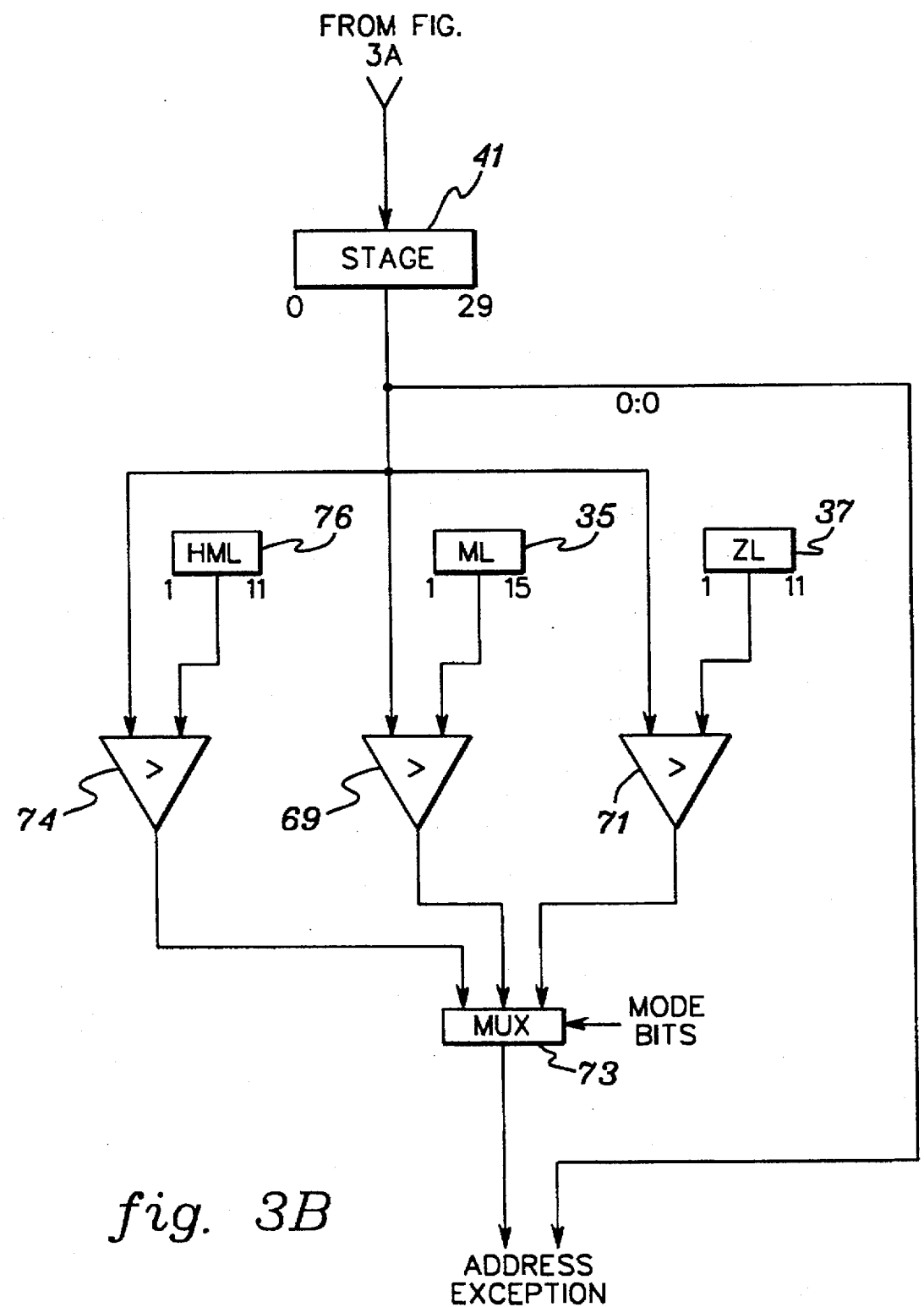
Figure 3C:
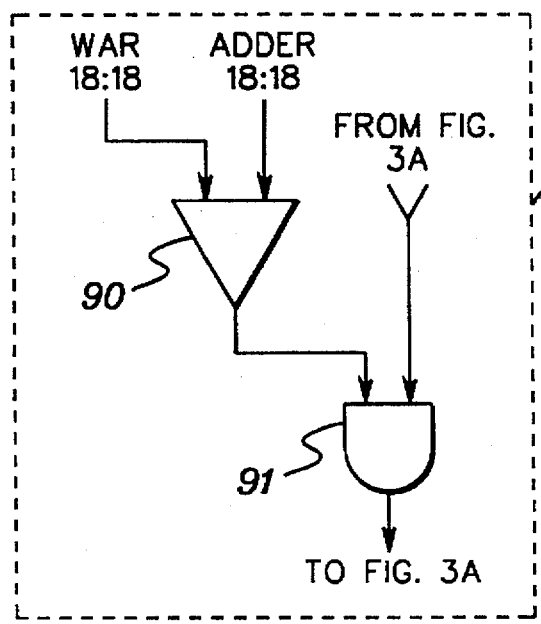
Figure 3D:
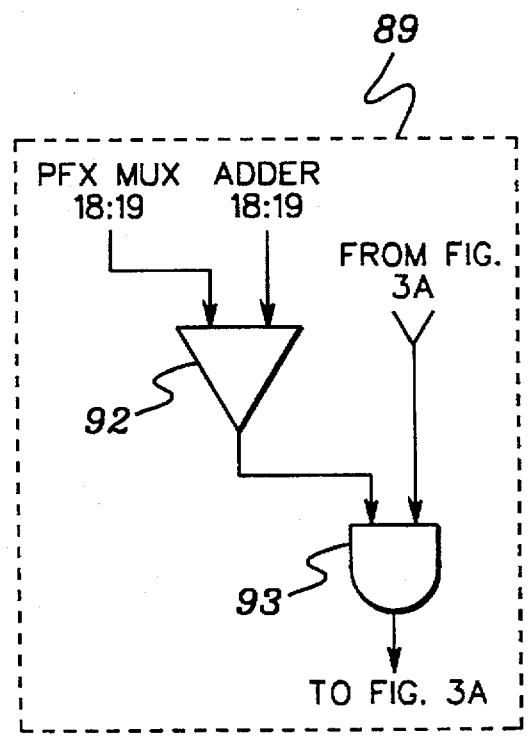
Figure 3E:
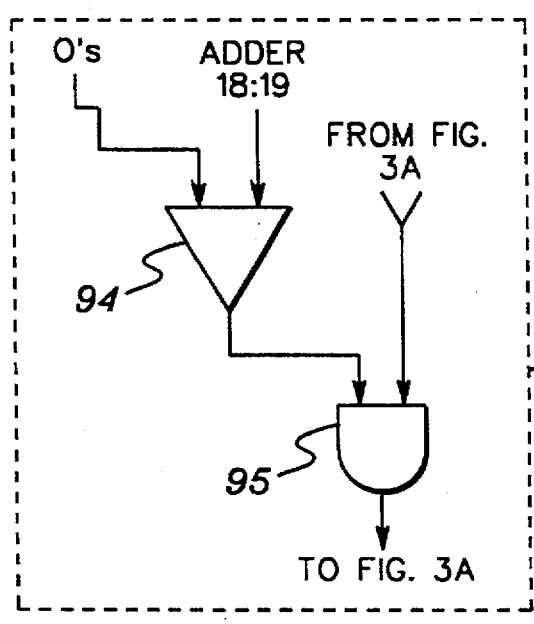

In accordance with the techniques of the present invention, an addressing exception is generated when the result from adder 39 exceeds the value of memory limit ("MU") register 35, zone limit ("ZL") register 37, or a Host Memory Limit ("HML") register 76 (FIG. 3B). Specifically, PZWM mux 75 for bits 1:19, along with the result of adder 39 (bits 0, 20:29) is latched in a stage register 41 at the end of the clock cycle that the atte determination is performed. The stage register 41 (which contains the latched PZWM MUX 75/adder result) is compared to ML register 35 by greater than ">" comparator 69, the output of stage register 41 is compared to ZL register 37 by greater than ">" comparator 71, and the output of stage register 41 is compared to HML register 76 by greater than comparator 74. The respective greater than comparators will produce a positive output if the output of PZWM MUX 75 exceeds either the ML, ZL, or HML register. A multiplexer 73 is used to select the appropriate comparator output based upon the emulation mode latches as will be apparent to one of ordinary skill in the art. For example, if g1=1 and rrf=1 then select ZL, if pagable=1 subset=0, mcds=0 and in the first state of DAT translation, then select ML, and if g1=0 and g2=0 then select HML. When the output of multiplexer 73 is high, an addressing exception is indicated.

Bit 0 of stage register 41 represents the carry out of bit 1 of adder 39. If bit 0 is set, an addressing exception is recognized, regardless of whether zoning/memory begin are involved.

To note, in one example, the addressing exception is not generated until the clock cycle following the atte determination. This is due to the latching of PZWM MUX 75/adder 39 output in stage register 41. However, the delay is of little consequence because the addressing exception indication is not needed during the actual processing. Specifically, a one clock cycle latency between address translation and addressing exception is acceptable.

To summarize, the techniques of the present invention facilitate the conversion of virtual addresses to absolute addresses using parallel techniques. This enables the tto/tti to atte processing aspect of the address translation to be performed within a single processor clock cycle using only a single adder. Thus, the latency between a presented tto/tti and the resultant atte is at most one clock cycle. The use of a single adder, one stage design also simplifies the required circuitry and facilitates simpler debugging. Thus, the present invention provides an improvement to address translation in processing systems.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

What is claimed is:

1. A method in a processor for use in translating a virtual address to an absolute address, said processor having a plurality of registers and operating according to a clock, wherein said plurality of registers comprises a plurality of first registers and a plurality of minus one registers, each of said plurality of minus one registers corresponding to one of said plurality of first registers, said method comprising:

(a) loading said plurality of registers with a first set of address translation parameters including loading each of the plurality of minus one registers with a value from its corresponding first register less one to produce a corresponding minus one value;

(b) thereafter adding a translation table origin ("tto") to an offset value to produce a base-plus-offset value; and (c) determining using said base-plus-offset value and one or more registers selected from said plurality of registers an address of a translation table entry ("atte"), said determining comprising performing at least one of prefixing, windowing, zoning and memory begin wherein said steps (b) and (c) are performed within a single clock cycle of said clock of said processor.

2. The method of claim 1, wherein said processor comprises a first adder which facilitates said adding step (b), and wherein said loading step comprises loading, using two's complement addition in said adder, each of the plurality of minus one registers with its corresponding minus one value.

3. The method of claim 1, wherein said determining step (c) further comprises comparing at least one of said plurality of first registers to said tto and comparing at least one of said plurality of minus one registers to said tto.

4. (Once Amended) The method of claim 3, wherein said adding step (b) produces a carry output, said carry output having a carry state and a no-carry state, and wherein said determining step (c) further comprises:

using results of said comparing at least one of said plurality of first registers in said determining step (c) if said carry output has said no-carry state; and using results of said comparing at least one of said plurality of minus one registers in said determining step (c) if said carry output has said carry state.

5. The method of claim 1, further comprising comparing windowing and prefixing type registers to said tto, and wherein said determining step (c) comprises selecting a portion of said base-plus-offset value as a first portion of said atte if said comparing windowing and prefixing type registers is negative.

6. The method of claim 1, further comprising comparing a prefixing type register to said tto, and wherein said determining step (c) comprises selecting a portion of said offset value as a first portion of said atte if said comparing said prefixing type register is positive.

7. The method of claim 1, further comprising comparing a zeroes type register to said tto, and wherein said determining step (c) comprises selecting a prefix value as a first portion of said atte if said comparing said zeroes type register is positive.

8. The method of claim 7, wherein said determining step (c) comprises selecting said prefix value as one of a value of a prefix register, a G1PFX+MB/ZO register and a G2PFX+MB/ZO register based upon a processor emulation mode.

9. The method of claim 8, wherein prior to said adding step (b) and said determining step (c), said method includes loading said G1PFX+MB/ZO register with a G1PFX value added to at most one of a ZO value or an MB value with a same adder used in said step (b) such that at most one of zoning and memory begin is performed during said determining step (c).

10. The method of claim 8, wherein prior to said adding step (b) and said determining step (c), said method includes loading said G2PFX+MB/ZO register with a G2PFX value added to at most one of a ZO value or an MB value with a same adder used in said step (b) such that at most one of zoning and memory begin is performed during said determining step (c).

11. The method of claim 1, further comprising a window address register comparison to said tto, and wherein said determining step (c) comprises selecting a window register value as a first portion of said atte if said window address register comparison is positive.

12. The method of claim 11, wherein said determining step (c) comprises selecting as said window register value a window register one ("WR1") value if a preselected bit of said base-plus-offset value is one and selecting as said window register a window register zero ("WR0") value if said preselected bit of said base-plus-offset value is zero.

* * * * *